(12) United States Patent
Nakagawa (10) Patent No.: US 11,076,355 B2
(45) Date of Patent: Jul. 27, 2021

(54) COMMUNICATION SYSTEM (71) Applicant: Toyota Jidosha Kabushiki Kaisha, Toyota (JP)

(72) Inventor: Masashi Nakagawa, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 16/362,153

(22) Filed: Mar. 22, 2019

(65) Prior Publication Data

US 2019/0306799 A1 Oct. 3, 2019

(30) Foreign Application Priority Data

Mar. 27, 2018 (JP) .............................. JP2018-060399

(51) Int. Cl.
*H04W 52/02* (2009.01)
*H04W 76/25* (2018.01)
*H04W 80/04* (2009.01)
*H04W 4/40* (2018.01)
H04L 29/08 (2006.01)
H04W 52/46 (2009.01)

(52) U.S. Cl.
CPC ......... *H04W 52/0277* (2013.01); *H04W 4/40* (2018.02); *H04W 52/028* (2013.01); *H04W 76/25* (2018.02); *H04W 80/04* (2013.01); H04L 67/26 (2013.01); H04W 52/46 (2013.01)

(58) Field of Classification Search
CPC . H04W 52/0277; H04W 76/25; H04W 80/04; H04W 4/40; H04W 52/028; H04W 52/46; H04W 4/44; H04W 52/0261; H04L 67/26; H04L 69/18; H04L 67/12; B60R 16/02
See application file for complete search history.

(56) References Cited

U.S. PATENT DOCUMENTS

2010/0152937 A1* 6/2010 Yamada .................. B60L 58/12
701/22
2016/0353395 A1* 12/2016 Kawagishi ............ H04W 84/18

FOREIGN PATENT DOCUMENTS

JP 2014-125098 A 7/2014

* cited by examiner

*Primary Examiner* — Dady Chery
(74) *Attorney, Agent, or Firm* — Dinsmore & Shohl LLP (57) ABSTRACT

A communication system includes an external server and an on-board device mounted on a vehicle. The external server is configured to communicate with the on-board device. A communication method used between the on-board device and the external server includes a first communication method and a second communication method with a larger communication load than the first communication method. The on-board device is configured to switch the communication method based on a vehicle state.

8 Claims, 6 Drawing Sheets

Fig.3 (2nd Communication Method)

Fig.5

COMMUNICATION SYSTEM

CROSS-REFERENCE TO RELATED APPLICATION

This application claims priority to Japanese Patent Application No. 2018-060399 filed on Mar. 27, 2018, incorporated herein by reference in its entirety.

BACKGROUND

1. Field

The present disclosure relates to a communication system that includes an on-board device, which is mounted on a vehicle, and an external server communicating with each other.

2. Description of Related Art

For example, Japanese Laid-Open Patent Publication No. 2014-125098 describes a communication system that includes an external communication device corresponding to an external server, a wireless communication device mounted on a vehicle, and an on-board device. The external communication device communicates with the on-board device via the wireless communication device. The wireless communication device is in a reception standby state only when it is determined that a reception standby condition is satisfied. When it is determined that the reception standby condition is not satisfied, the wireless communication device is in a reception non-standby state. This reduces power consumption of a vehicle-side power supply caused by a reception standby current of the wireless communication device.

From the standpoint of information security, in the communication system, the external communication device may transmit a signal to be received by the on-board device using a higher communication protocol of TCP/IP (e.g., HTTP). In this case, the wireless communication device and the on-board device can determine whether or not to allow a signal from the outside of the vehicle to be received. However, when a signal is received from the outside of the vehicle, the power consumption of the vehicle-side power supply cannot be reduced. Thus, there is still room for improvement from the standpoint of power saving of the vehicle.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

It is an object of the present disclosure to provide a communication system capable of reducing power consumption of a vehicle-side power supply during communication.

One aspect of the present disclosure is a communication system that includes an external server and an on-board device mounted on a vehicle. The external server is configured to communicate with the on-board device. A communication method used between the on-board device and the external server includes a first communication method and a second communication method with a larger communication load than the first communication method. The on-board device is configured to switch the communication method based on a vehicle state.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

First Embodiment

A first embodiment of a communication system will now be described.

The communication system according to the first embodiment includes an on-board device mounted on a vehicle and an information center that manages vehicle information of a plurality of vehicles. The on-board device and the information center communicate with each other. The system has a first communication method in which direct communication is performed between a vehicle and the information center and a second communication method in which communication is performed between the vehicle and the information center via a relay server. The system switches the communication method in accordance with a state of the vehicle. The information center corresponds to an external server. More specifically, the information center corresponds to a first external server, and the relay server corresponds to a second external server. Each of the on-board device, the information center, and the relay server may be configured to be circuitry including: 1) one or more processors that operate in accordance with a computer program (software); 2) one or more dedicated hardware circuits such as an application specific integrated circuit (ASIC) that execute at least one or more of the various processes; or 3) a combination of these. The processor includes a CPU and a memory such as a RAM and a ROM. The memory stores program codes or commands configured to cause the CPU to execute the processes. The memory, that is, a computer readable medium, includes various available media that can be accessed with a general purpose or a dedicated computer.

Figure 1:
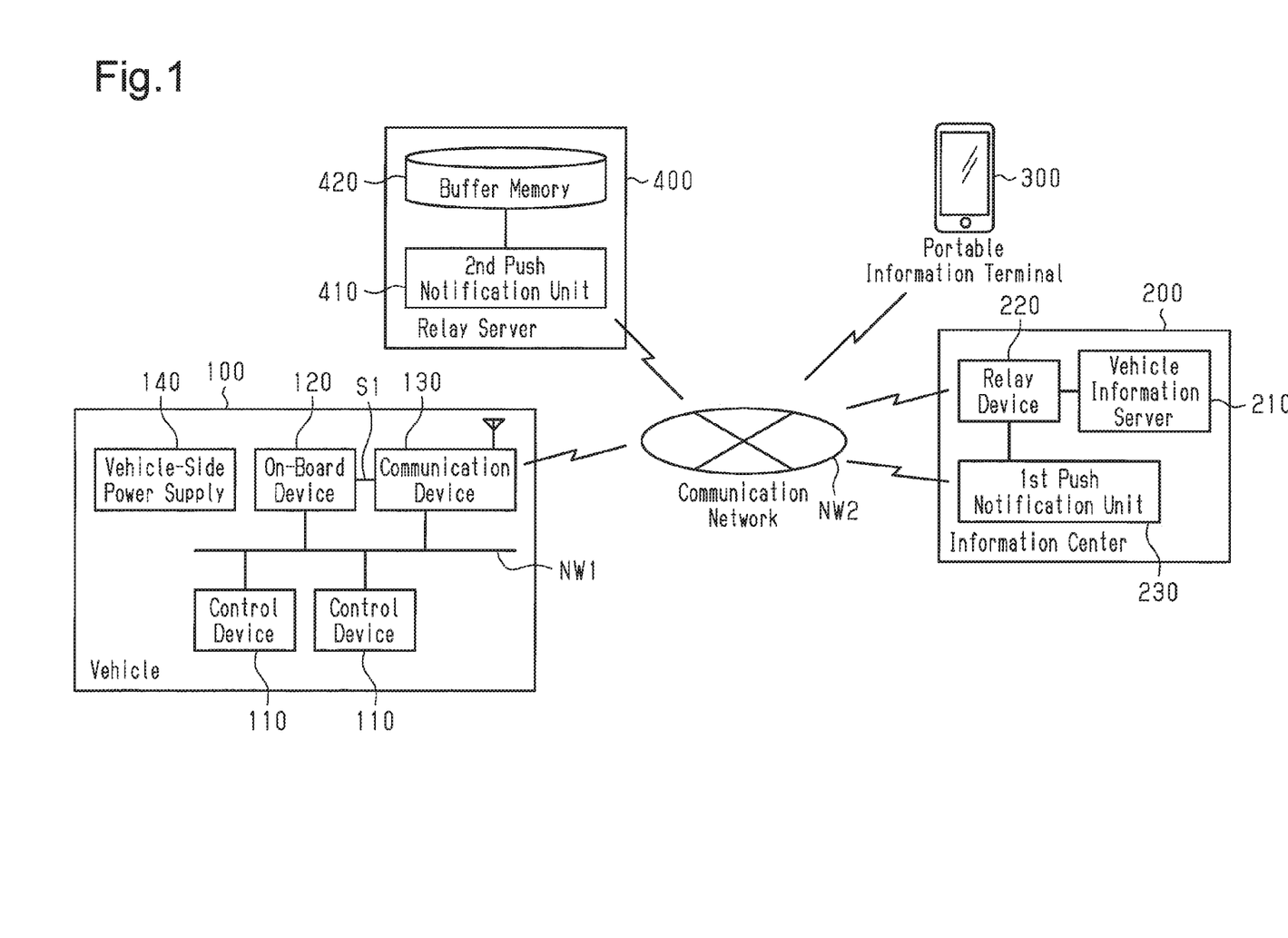
FIG. 1 is a block diagram showing a schematic configuration of a communication system according to a first embodiment.

More specifically, as shown in FIG. 1, a vehicle 100 includes control devices 110, an on-board device 120, and a communication device 130. The control devices 110, the on-board device 120, and the communication device 130 are connected to each other by a communication bus NW1. Furthermore, the on-board device 120 and the communication device 130 are connected by a communication line S1, which is a communication path different from the communication bus NW1.

Each of the control devices 110 is an electronic control device that performs various vehicle controls and periodically transmits a vehicle signal indicating the vehicle state such as the running state of a traveling power source (e.g., engine) and the state of the vehicle-side power supply 140 to the on-board device 120.

The on-board device 120 recognizes the vehicle state based on the vehicle signal periodically received from the control device 110 through the communication bus NW1 and transmits data indicating the recognized vehicle state from the communication device 130 to the information center 200 through a communication network NW2.

The information center 200 includes a vehicle information server 210, a relay device 220, and a first push notification unit 230.

The vehicle information server 210 is a server that manages vehicle information of a plurality of vehicles. The vehicle information may be information such as, for example, weather information and traffic congestion information periodically distributed from the information center 200 to the vehicle 100. The vehicle information may include a command that performs a remote operation to acquire various kinds of information processed by the control device 110 from the vehicle 100 or a command that performs a remote operation so that the control device 110 performs various controls on the vehicle. When the user of the vehicle 100 performs the setting with a portable information terminal 300, a command related to a remote operation is transmitted from the portable information terminal 300 to the vehicle information server 210 through the communication network NW2.

The vehicle information server 210 receives data indicating the vehicle state from the on-board device 120 through the communication network NW2 and manages the received data indicating the vehicle state. The vehicle information server 210 determines a communication method that is used for communication between the vehicle 100 and the information center 200 based on the vehicle state. In a case in which it is determined that the first communication method is used, the vehicle information server 210 transmits vehicle information to the vehicle 100 through the first push notification unit 230. In a case in which it is determined that the second communication method is used, the vehicle information server 210 transmits vehicle information to the vehicle 100 through the relay server 400.

In a case in which a request for a connection with the vehicle information server 210 through the communication network NW2 is received from the vehicle 100, the relay device 220 relays the transmission of the vehicle information from the vehicle information server 210 to the vehicle 100. At this time, in a case in which the vehicle information server 210 assigns the communication performed through the first communication method, the relay device 220 transfers the vehicle information received from the vehicle information server 210 to the first push notification unit 230. In a case in which the vehicle information server 210 assigns the communication performed through the second communication method the relay device 220 transfers the vehicle information received from the vehicle information server 210 to the relay server 400

The first push notification unit 230 determines whether or not to perform a push notification of the vehicle information received via the relay device 220 from the vehicle information server 210. The push notification is a notification actively performed by the vehicle information server 210 to the user of a vehicle 100 that permits the notification of the vehicle information. When performing the push notification, the first push notification unit 230 makes a request for a connection with the communication device 130 through the communication network NW2. In a case in which the connection with the communication device 130 is established, the first push notification unit 230 transmits the vehicle information received from the vehicle information server 210 to the communication device 130 through the communication network NW2.

The relay server 400 includes a second push notification unit 410 and a buffer memory 420. The buffer memory 420 corresponds to a storage unit.

The second push notification unit 410 determines whether or not to perform a push notification of the vehicle information received via the relay device 220 from the vehicle information server 210. When performing the push notification, the second push notification unit 410 makes a request for connection with the communication device 130 through the communication network NW2. The second push notification unit 410 performs a frequent large-volume push notification as compared to the first push notification unit 230. Thus, the second push notification unit 410 asynchronously receives vehicle information from the vehicle information server 210 and temporarily stores the received vehicle information in the buffer memory 420. In other words, the second push notification unit 410 asynchronously receives communication data from the vehicle information server 210 and temporarily stores the received communication data in the buffer memory 420. In a case in which the connection with the communication device 130 is established, the second push notification unit 410 transmits the vehicle information from the buffer memory 420 to the communication device 130 through the communication network NW2.

The flow of processing in a case in which the communication system of the first embodiment performs communication through the first communication method will now be described.

Figure 2:
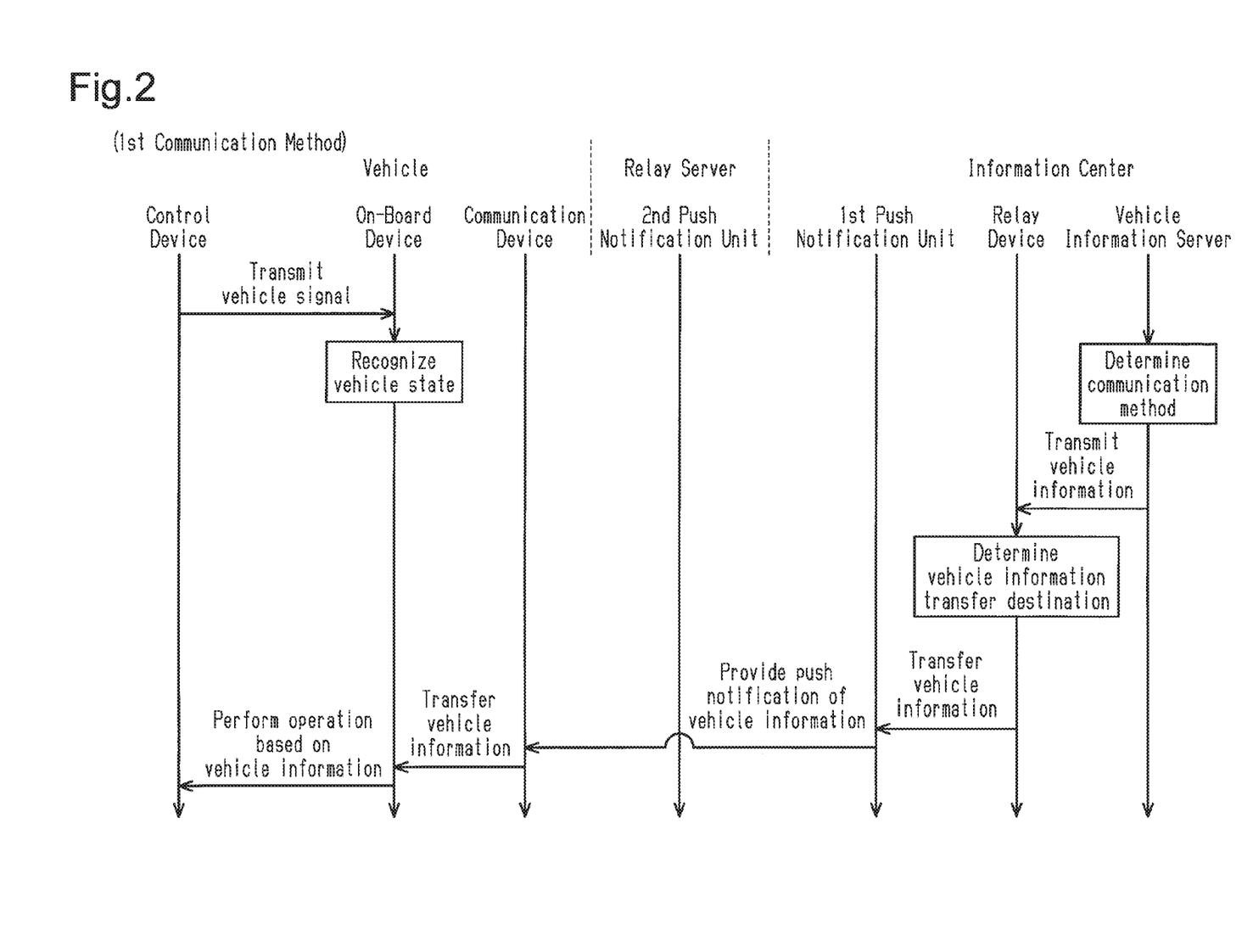
FIG. 2 is a sequence chart showing a flow of processing in a case in which the communication system of FIG. 1 performs communication through a first communication method.

As shown in FIG. 2, the control device 110 periodically transmits a vehicle signal to the on-board device 120 through the communication bus NW1. The on-board device 120 recognizes the vehicle state based on the vehicle signal received from the control device 110.

The vehicle information server 210 transmits vehicle information to the user of a vehicle 100 that permits the notification of the vehicle information from the vehicle information server 210 at a predetermined timing.

At this time, the vehicle information server 210 assigns the communication method based on the vehicle state of the target vehicle 100 and then transmits the vehicle information to the relay device 220. More specifically, the on-board device 120 determines whether or not the recognized vehicle state satisfies a predetermined condition. When it is determined that the recognized vehicle state satisfies the predetermined condition, the on-board device 120 transmits a switch signal for switching the communication method from the first communication method to the second communication method to the information center 200. The switch signal is an example of data indicating the vehicle state. In the example shown in FIG. 2, the recognized vehicle state does not satisfy the predetermined condition. Thus, the on-board device 120 does not transmit the switch signal to the information center 200. Accordingly, the vehicle information server 210 assigns the first communication method as the communication method and transmits the vehicle information to the relay device 220.

The relay device 220 determines the destination to which the vehicle information is transferred based on the communication method assigned by the vehicle information server 210. In the example shown in FIG. 2, the vehicle information server 210 assigns the communication performed through the first communication method. Thus, the relay device 220 transfers the vehicle information received from the vehicle information server 210 to the first push notification unit 230

When the vehicle information is transferred from the relay device 220 to the first push notification unit 230, the first push notification unit 230 performs a push notification of the transferred vehicle information on the communication device 130 through the communication network NW2 When the push notification of the vehicle information is received from the first push notification unit 230, the communication device 130 transfers the received vehicle information to the on-board device 120 through the communication line S1.

Thereafter, the on-board device 120 performs an operation on the control device 110 based on the vehicle information transferred from the communication device 130. More specifically, when the vehicle information is information that is periodically distributed from the information center 200 to the vehicle 100, the on-board device 120 updates the setting of the vehicle information. When the vehicle information is a command that performs a remote operation to acquire various kinds of information processed by the control device 110 from the vehicle 100 or a command that performs a remote operation so that the control device 110 performs various controls on the vehicle, the on-board device 120 performs the operation specified by the command on the control device 110.

The flow of processing in a case in which the communication system of the first embodiment performs communication using the second communication method will now be described.

Figure 3:
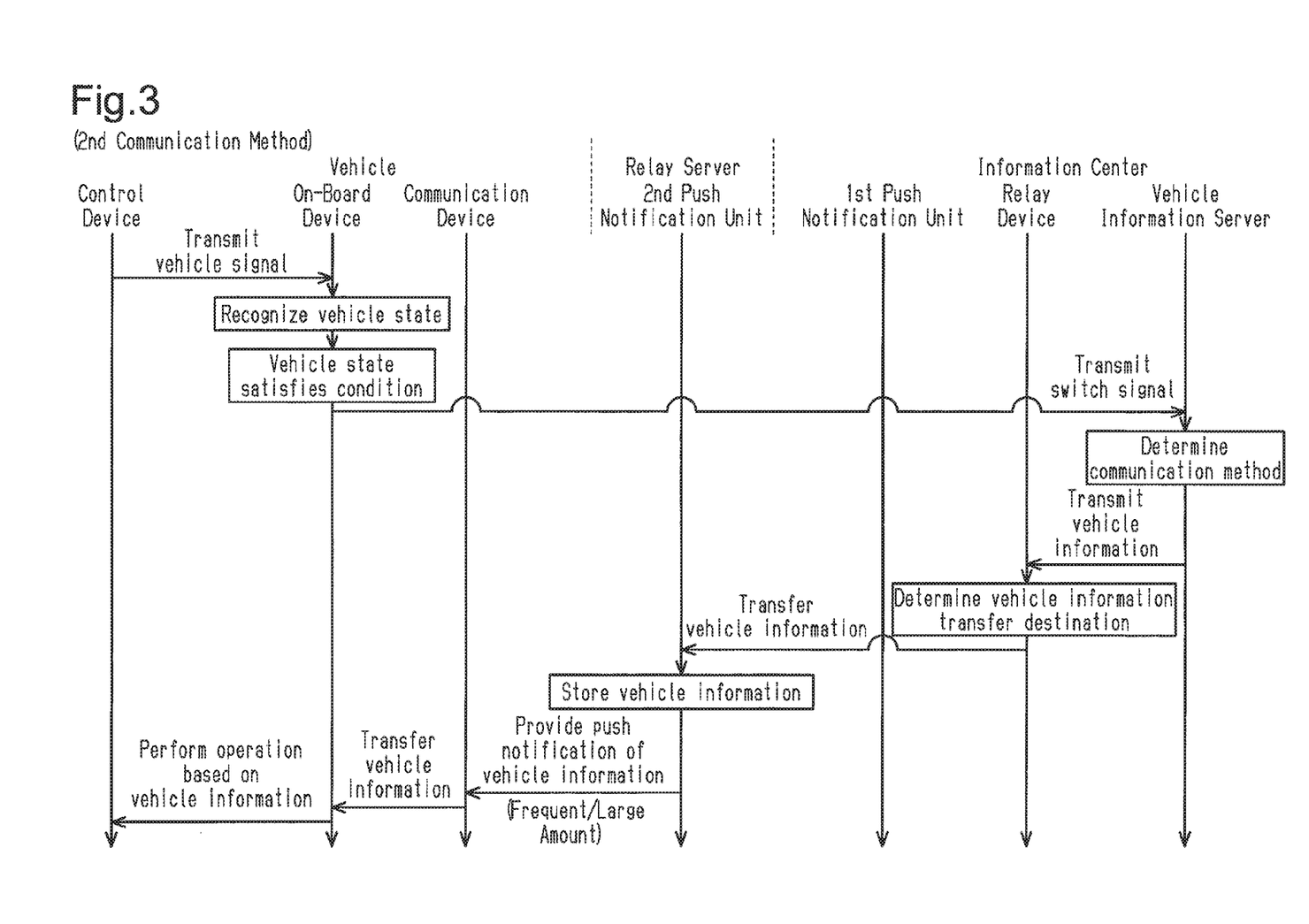
FIG. 3 is a sequence chart showing a flow of processing in a case in which the communication system of FIG. 1 performs communication through a second communication method.

As shown in FIG. 3, the control device 110 periodically transmits a vehicle signal to the on-board device 120 through the communication bus NW1. The on-board device 120 recognizes the vehicle state based on the vehicle signal received from the control device 110.

The vehicle information server 210 transmits vehicle information to the user of the vehicle 100 that permits the notification of the vehicle information from the vehicle information server 210 at a predetermined timing.

At this time, the vehicle information server 210 assigns the communication method based on the vehicle state of the target vehicle 100 and then transmits the vehicle information to the relay device 220. More specifically, the on-board device 120 determines whether or not the recognized vehicle state satisfies a predetermined condition. When it is determined that the recognized vehicle state satisfies the predetermined condition, the on-board device 120 transmits a switch signal for switching the communication method from the first communication method to the second communication method to the information center 200. In the example shown in FIG. 3, the recognized vehicle state satisfies the predetermined condition. Thus, the on-board device 120 transmits the switch signal to the information center 200. Accordingly, the vehicle information server 210 assigns the second communication method as the communication method and then transmits the vehicle information to the relay device 220.

The relay device 220 determines the destination to which the vehicle information is transferred based on the communication method assigned by the vehicle information server 210. In the example shown in FIG. 3, the vehicle information server 210 assigns the communication performed through the second communication method. Thus, the relay device 220 transfers the vehicle information received from the vehicle information server 210 to the second push notification unit 410.

When the vehicle information is transferred from the relay device 220 to the second push notification unit 410, the second push notification unit 410 performs a push notification of the transferred vehicle information on the communication device 130 through the communication network NW2. At this time, the second push notification unit 410 asynchronously receives vehicle information from the vehicle information server 210 and temporarily stores the received vehicle information in the buffer memory 420. The second push notification unit 410 performs the push notification of the vehicle information stored in the buffer memory 420 on the communication device 130 via the communication network NW2. At this time, the push notification of the second push notification unit 410 has a larger volume and is performed more frequently than the push notification of the first push notification unit 230.

When the push notification of the vehicle information is received from the second push notification unit 410, the communication device 130 transfers the received vehicle information to the on-board device 120 through the communication line S1.

Thereafter, the on-board device 120 performs an operation on the control device 110 based on the vehicle information transferred from the communication device 130.

The flow of processing in a case in which the communication system of the first embodiment switches the communication method based on the vehicle state will now be described.

Figure 4:
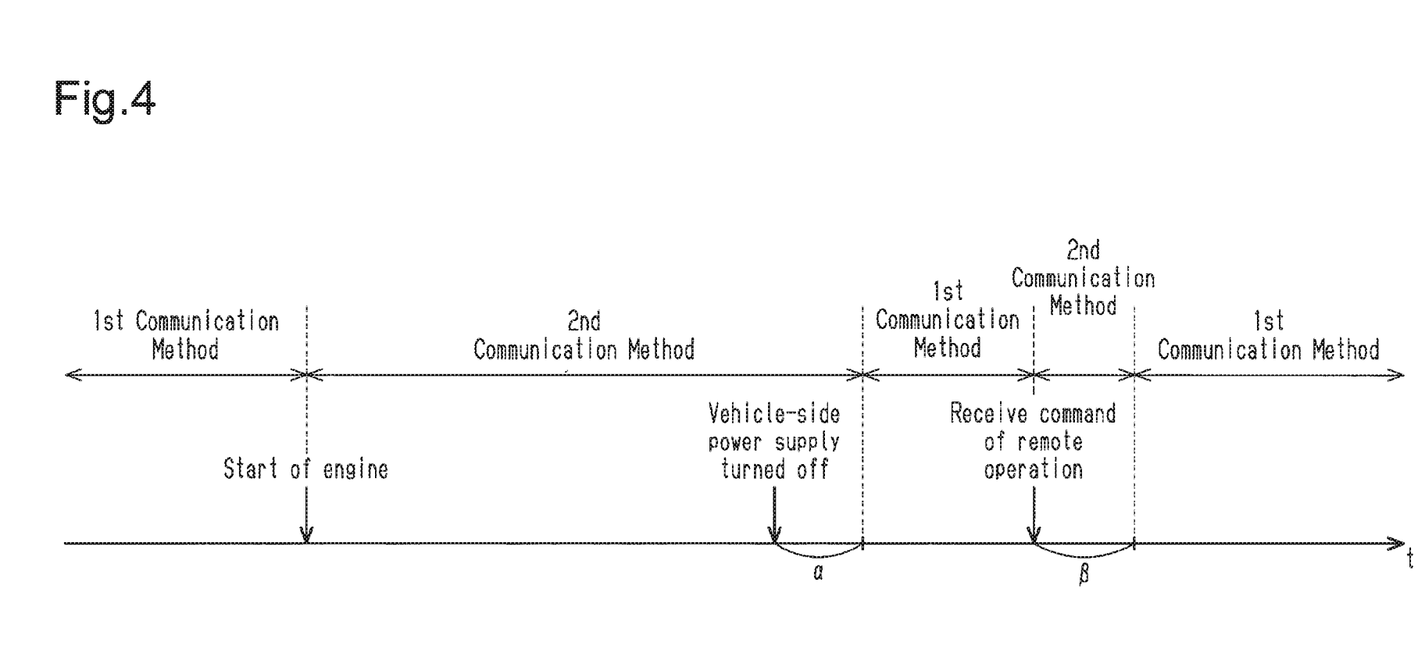
FIG. 4 is a schematic diagram showing a correspondence relationship between a vehicle state and a communication method.

As shown in FIG. 4, in the first embodiment, when the engine of the vehicle 100 is stopped, the communication method is normally set to the first communication method.

When a start of the engine of the vehicle 100 is recognized as the vehicle state, the communication method is switched from the first communication method to the second communication method. When the engine of the vehicle 100 is started, the power of the vehicle-side power supply 140 is readily ensured. This allows the communication to be performed through a communication method with a relatively large communication load and consuming a relatively large amount of power.

After the engine of the vehicle 100 is started, when a first period α has elapsed from when the engine is stopped and the vehicle-side power supply 140 is turned off, the communication method is switched from the second communication method to the first communication method. Consequently, the communication through the second communication method is enabled so that a large volume of vehicle information is smoothly transmitted for a predetermined period of time after the vehicle-side power supply 140 is turned off. In addition, power consumption can be reduced so that the power of the vehicle-side power supply 140 is ensured.

Furthermore, after the communication method is switched to the first communication method, when the vehicle 100 receives a command of a remote operation, or the vehicle information, from the information center 200, the communication is performed through the second communication method until the second period β elapses after the reception of the command. A sufficient communication capacity is ensured from a point in time when the vehicle 100 receives a command of a remote operation until a point in time when the operation specified by the command is completed.

The operation of the communication system according to the first embodiment will now be described.

While the engine of the vehicle 100 is running, power is supplied to the vehicle-side power supply 140. Thus, the power of the vehicle-side power supply 140 is readily ensured. The vehicle 100 communicates with the outside of the vehicle through the second communication method, which consumes a relatively large amount of power.

When the engine of the vehicle 100 is stopped, the supply of power to the vehicle-side power supply 140 accompanying the running of the engine is also stopped. Thus, the vehicle 100 communicates with the outside of the vehicle through the first communication method, which consumes a relatively small amount of power, to reduce the power consumption of the vehicle 100. At this time, the communication capacity is limited in the communication with the outside of the vehicle through the first communication method. This restricts unauthorized access from the outside of the vehicle and increases information security.

While the engine of the vehicle 100 is stopped, when the vehicle 100 receives a command related to a remote operation of the vehicle 100 from the outside of the vehicle, the communication is performed through the second communication method until a period of time specified by the command elapses. This allows communication through the second communication method having a relatively large communication capacity. Consequently, the remote operation is smoothly performed on the vehicle 100.

As described above, the first embodiment obtains the following advantages.

(1) The communication method is switched based on the vehicle state. This reduces the power consumption of the vehicle-side power supply 140 at the time of communication.

(2) When the engine of the vehicle 100 is running and the vehicle-side power supply 140 is supplied with the power, the communication is performed through the second communication method with a large communication load. This allows the frequent large-volume communication to be performed.

(3) When the engine of the vehicle 100 is in the start state and the frequent large-volume communication is performed through the second communication method, even if the engine of the vehicle 100 is switched from the running state to the stopped state, the communication method will not be switched until a predetermined period of time elapses. This avoids a situation in which the communication speed decreases in accordance with changes in the state of the engine of the vehicle 100.

(4) When a remote operation is performed on the vehicle 100, the second communication method with a large communication load is maintained until a period of time specified by the command of the remote operation elapses. Thus, while the remote operation is performed on the vehicle 100, the quality of frequent large-volume communication is ensured. The remote operation is smoothly performed on the vehicle 100.

(5) When the communication is performed through the second communication method, the vehicle information is asynchronously transmitted from the information center 200 to the relay server 400, and the vehicle information is stored in the buffer memory 420. The vehicle information stored in the buffer memory 420 is transmitted from the relay server 400 to the vehicle 100 with a higher data processing capability than the information center 200. This allows the frequent large-volume communication to be performed as compared with a case in which the vehicle information is directly transmitted from the information center 200 to the vehicle 100.

Second Embodiment

A second embodiment of a communication system will be described. The second embodiment is different from the first embodiment in that the push notification does not include the vehicle information. Thus, in the following description, a configuration that is different from the configuration in the first embodiment will be mainly described, and redundant explanation of the configuration same as or equivalent to the configuration in the first embodiment will be omitted.

The flow of processing in a case in which the communication system of the second embodiment performs communication using the first communication method will now be described.

Figure 5:
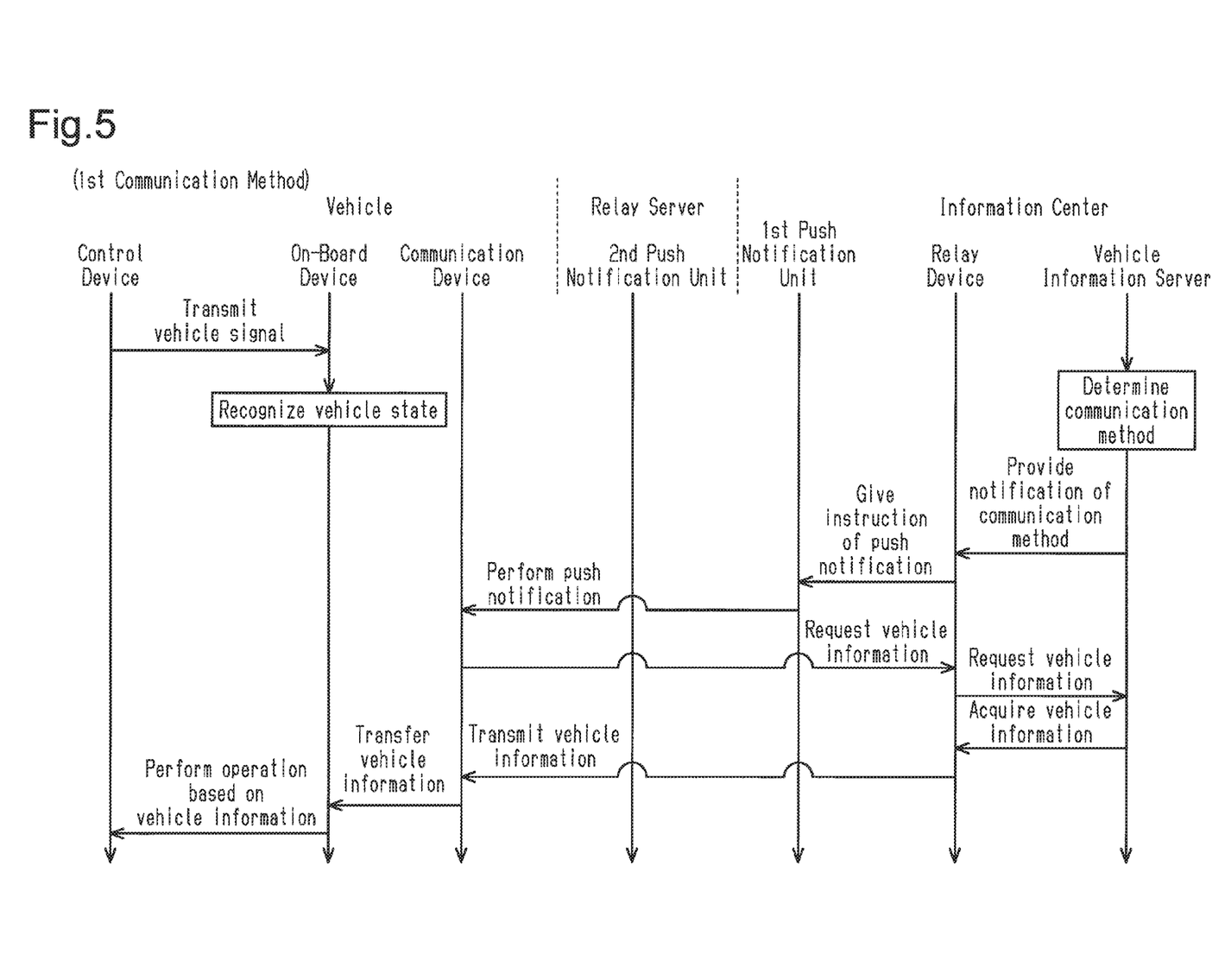
FIG. 5 is a sequence chart showing a flow of processing in a case in which a second embodiment of a communication system performs communication through a first communication method.

As shown in FIG. 5, the control device 110 periodically transmits a vehicle signal to the on-board device 120 through the communication bus NW1. The on-board device 120 recognizes the vehicle state based on the vehicle signal received from the control device 110.

The vehicle information server 210 transmits the vehicle information to the user of a vehicle 100 that permits the notification of the vehicle information from the vehicle information server 210 at a predetermined timing.

At this time, the vehicle information server 210 assigns the communication method based on the vehicle state of the target vehicle 100 and then transmits the vehicle information to the relay device 220. More specifically, the on-board device 120 determines whether or not the recognized vehicle state satisfies a predetermined condition. When it is determined that the recognized vehicle state satisfies the predetermined condition, the on-board device 120 transmits a switch signal for switching the communication method from the first communication method to the second communication method to the information center 200. In the example shown in FIG. 5, the recognized vehicle state does not satisfy the predetermined condition. Thus, the on-board device 120 does not transmit the switch signal to the information center 200. Accordingly, the vehicle information server 210 assigns the first communication method as the communication method and transmits the vehicle information to the relay device 220.

The relay device 220 determines a target that is instructed to perform the push notification based on the communication method assigned by the vehicle information server 210. In the example shown in FIG. 5, the vehicle information server 210 assigns the communication performed through the first communication method. Thus, the relay device 220 instructs the first push notification unit 230 to perform the push notification through the first communication method based on the notification of the communication method received from the vehicle information server 210.

When the instruction of the push notification through the first communication method is received from the relay device 220, the first push notification unit 230 performs the push notification on the communication device 130 through the communication network NW2. When the push notification is received from the first push notification unit 230, the communication device 130 requests the vehicle information from the relay device 220 through the communication network NW2.

When the request for vehicle information is received from the communication device 130, the relay device 220 transfers the request for vehicle information to the vehicle information server 210. The relay device 220 acquires the vehicle information corresponding to the vehicle 100 that has requested the vehicle information from the vehicle information server 210 and transmits the acquired vehicle information to the communication device 130.

When the vehicle information is received from the relay device 220, the communication device 130 transfers the received vehicle information to the on-board device 120 through the communication line S1.

Thereafter, the on-board device 120 performs an operation on the control device 110 based on the vehicle information transferred from the communication device 130.

The flow of processing in a case in which the communication system of the second embodiment performs communication using the second communication method will now be described.

Figure 6:
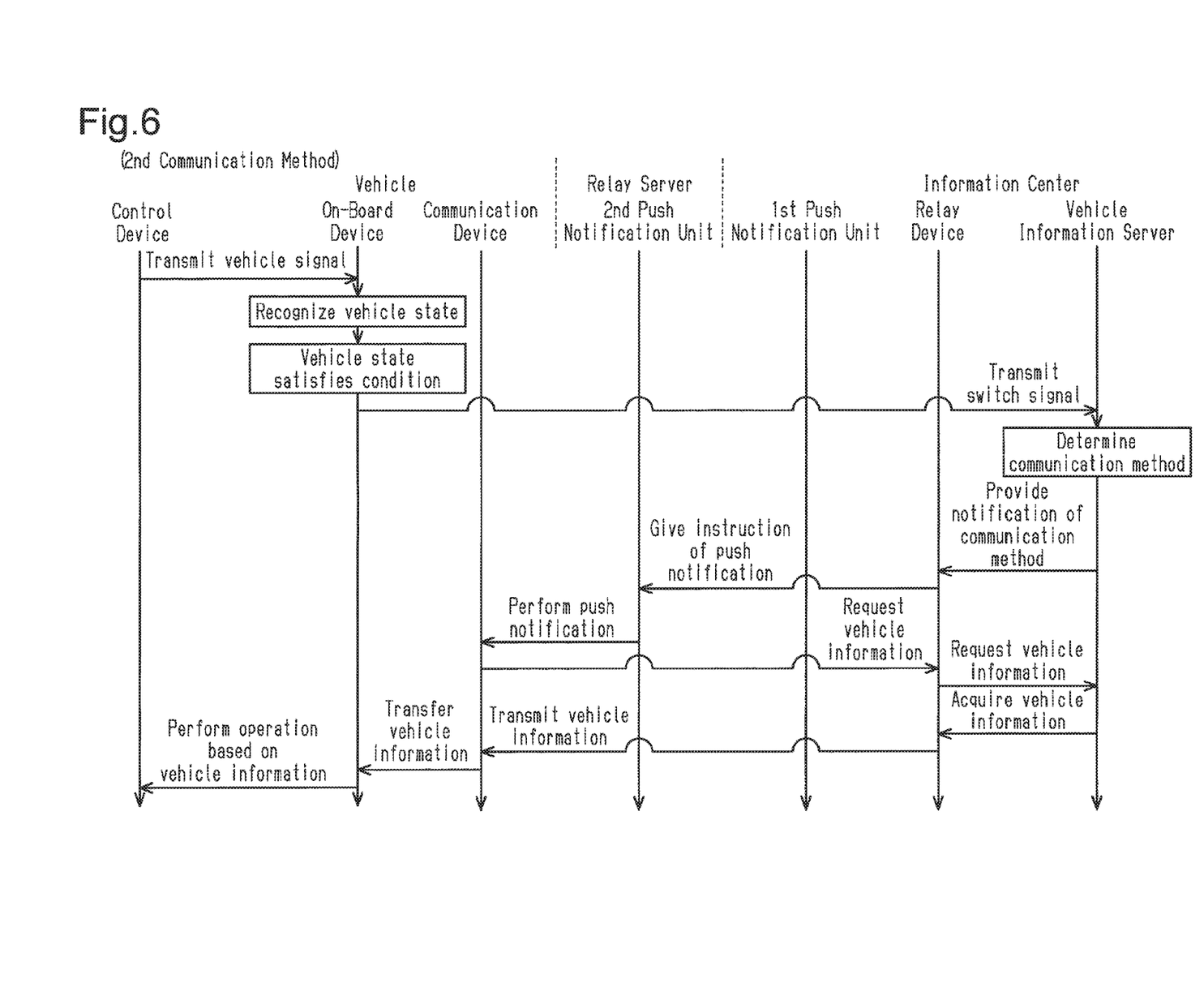
FIG. 6 is a sequence chart showing a flow of processing in a case in which the communication system of FIG. 5 performs communication through a second communication method.

As shown in FIG. 6, the control device 110 periodically transmits a vehicle signal to the on-board device 120 through the communication bus NW1. The on-board device 120 recognizes the vehicle state based on the vehicle signal received from the control device 110.

The vehicle information server 210 transmits the vehicle information to the user of a vehicle 100 that permits the notification of the vehicle information from the vehicle information server 210 at a predetermined timing.

At this time, the vehicle information server 210 assigns the communication method based on the vehicle state of the target vehicle 100 and then transmits the vehicle information to the relay device 220. More specifically, the on-board device 120 determines whether or not the recognized vehicle state satisfies a predetermined condition. When it is determined that the recognized vehicle state satisfies the predetermined condition, the on-board device 120 transmits a switch signal for switching the communication method from the first communication method to the second communication method to the information center 200. In the example shown in FIG. 6, the recognized vehicle state satisfies the predetermined condition. Thus, the on-board device 120 transmits the switch signal to the information center 200. Accordingly, the vehicle information server 210 assigns the second communication method as the communication method and then transmits the vehicle information to the relay device 220.

The relay device 220 determines a target that is instructed to perform the push notification based on the communication method assigned by the vehicle information server 210. In the example shown in FIG. 6, the vehicle information server 210 assigns the communication performed through the second communication method. Thus, the relay device 220 instructs the second push notification unit 410 to perform the push notification through the second communication method based on the notification of the communication method received from the vehicle information server 210. At this time, the push notification of the second push notification unit 410 is performed more frequently than the push notification of the first push notification unit 230.

When the instruction of push notification is received from the relay device 220, the second push notification unit 410 performs the push notification on the communication device 130 through the communication network NW2. When the push notification is received from the second push notification unit 410, the communication device 130 requests the vehicle information from the relay device 220 through the communication network NW2.

When the request for vehicle information is received from the communication device 130, the relay device 220 transfers the request for vehicle information to the vehicle information server 210. The relay device 220 acquires the vehicle information corresponding to the vehicle 100 that has requested the vehicle information from the vehicle information server 210 and transmits the acquired vehicle information to the communication device 130.

When the vehicle information is received from the relay device 220, the communication device 130 transfers the received vehicle information to the on-board device 120 through the communication line S1.

Thereafter, the on-board device 120 performs an operation on the control device 110 based on the vehicle information transferred from the communication device 130.

As described above, the second embodiment obtains the following advantage in addition to advantages (1) to (5) of the first embodiment.

(6) When the communication device 130 receives the push notification from the outside of the vehicle without including vehicle information in the push notification, the communication device 130 makes a request, for the vehicle information to the information center 200. This reduces the communication load when the information center 200 frequently performs the push notification on the communication device 130 via the relay server 400.

Other Embodiments

It should be apparent to those skilled in the art that the present disclosure may be embodied in many other specific forms without technically contradicting each other or departing from the spirit or scope of the disclosure. Particularly, it should be understood that the present disclosure may be embodied in the following forms.

The engine is not limited to a conventional engine. The conventional engine refers to an internal combustion engine that is not combined with a motor. The traveling power source may be an engine, a motor, or a combination of an engine and a motor.

In the first embodiment, when the communication is performed through the second communication method, the vehicle information is asynchronously transmitted from the information center 200 to the relay server 400, and the vehicle information is stored in the buffer memory 420. The vehicle information stored in the buffer memory 420 is transmitted from the relay server 400 to the vehicle 100 with a higher data processing capability than the information center 200. However, if the data processability of each of the information center 200 and the relay server 400 is sufficiently ensured, the relay server 400 may not need to asynchronously receive the vehicle information from the information center 200 and store the vehicle information in the buffer memory 420. Instead, the vehicle information received from the information center 200 may be transmitted to the vehicle 100 in real time.

In each of the above-described embodiments, when a remote operation is performed on the vehicle 100, the second communication method with a large communication load is maintained until the period of time specified by the command of the remote operation elapses. Instead, when the remote operation is performed on the vehicle 100, the second communication method with a large communication load may be maintained until a termination signal of the command of the remote operation is received.

In each of the above-described embodiments, when the engine of the vehicle 100 is in the running state and the frequent large-volume communication is performed through the second communication method, even if the engine of the vehicle 100 is switched from the running state to the stopped state, the communication method is not switched until a predetermined period of time elapses. Instead, when the engine of the vehicle 100 is in the running state and the frequent large-volume communication is performed through the second communication method, if the engine of the vehicle 100 is switched from the running state to the stopped state, the communication method may not be switched until the reception of the large-volume vehicle information is completed through the second communication method. Further, even when the engine of the vehicle 100 is in the running state and the engine of the vehicle 100 is switched from the running state to the stopped state while the frequent large-volume communication is performed through the second communication method, the communication method may be configured not to be switched, for example, if the vehicle 100 is being charged by solar charging or the like or if the state of charge of a battery in the vehicle 100 is greater than or equal to a predetermined threshold value. Also, even when the traveling power source of the vehicle 100 is in the running state and the traveling power source is switched from the running state to the stopped state while the frequent large-volume communication is performed through the second communication method, the communication method may be configured not to be switched, for example, if the energy state of the traveling power source is greater than or equal to a predetermined threshold value. When the energy state of the traveling power source is less than the predetermined threshold value, the communication method may be switched from the second communication method to the first communication method.

In each of the above-described embodiments, when the engine of the vehicle 100 is in the running state and the vehicle-side power supply 140 is supplied with power, the communication is performed through the second communication method with a large communication load. However, even when the engine of the vehicle 100 is in the running state, if the processing load of the communication device 130 is relatively large, the communication device 130 may request the vehicle information server 210 to switch the communication method from the second communication method to the first communication method.

In each of the above-described embodiments, the case in which the engine of the vehicle 100 is in the running state is described as an example of the state in which the vehicle-side power supply 140 can be supplied with power. However, the state in which the vehicle-side power supply 140 can be supplied with power is not limited thereto and may be, for example, a state in which the IG (ignition) switch of the vehicle is activated, a state in which charging can be performed by a solar panel mounted on the vehicle, or a state in which power can be supplied from an on-board battery that is used during EV traveling.

In each of the above-described embodiments, when the instruction of push notification is received from the relay device 220, the relay server 400 performs the push notification on the communication device 130 through the communication network NW2. Instead, when the vehicle state satisfies a predetermined condition, the on-board device 120 may transmit a preparation request of a push notification to the relay server 400. On the condition that the preparation request of the push notification is received from the on-board device 120, the relay server 400 may perform the push notification on the on-board device 120 based on the instruction from the relay device 220.

In each of the above-described embodiments, the vehicle information server 210 determines the vehicle state received from the on-board device 120 through the communication network NW2 and determines the communication method that is used in the communication between the vehicle 100 and the information center 200 based on the vehicle state. However, the vehicle information server 210 may not need to determine the communication method. For example, the relay device 220 of the information center 200 or the relay server 400 may determine the communication method.

In each of the above-described embodiments, the first push notification unit 230 and the second push notification unit 410 are provided in separate external servers. However, the first push notification unit 230 and the second push notification unit 410 may be provided in a common external server. In this case, the common external server may be the information center 200, or may be an external server different from the information center 200.

What is claimed is:

1. A communication system, comprising:
   a first external server and a second external server; and
   an on-board device mounted on a vehicle, wherein
   the first and second external servers are configured to communicate with the on-board device,
   the second external server includes a storage unit configured to store communication data transmitted from the first external server,
   a communication method used between the on-board device and the first and second external servers includes a first communication method and a second communication method with a larger communication load than the first communication method, wherein
   communication through the first communication method is communication performed by the first external server with the on-board device without communicating with the second external server,
   communication through the second communication method is communication performed by the first external server with the on-board device via the second external server, and the second external server is configured to receive the communication data from the first external server, store the received communication data in the storage unit, and transmit the communication data from the storage unit to the on-board device with a higher data processing capability than the first external server, and the on-board device is configured to switch the communication method based on a vehicle state.

2. The communication system according to claim 1, wherein the vehicle state includes a state of a vehicle-side power supply configured to supply power to the on-board device, and the on-board device is configured to perform communication through the second communication method when the state of the vehicle-side power supply is a state in which the vehicle-side power supply is supplied with power.

3. The communication system according to claim 2, wherein the on-board device is configured to maintain communication through the second communication method from a point in time when a traveling power source of a vehicle changes from an running state to a stopped state until a point in time when a specified condition is satisfied.

4. The communication system according to claim 3, wherein the specified condition includes a condition that a predetermined period of time has elapsed from a point in time when the traveling power source is changed to the stopped state.

5. The communication system according to claim 3, wherein the specified condition includes a condition that an energy state of the traveling power source is less than a predetermined threshold value.

6. The communication system according to claim 1, wherein the on-board device is configured, when a command of a remote operation of a vehicle is received from the first external server, to perform communication through the second communication method until a period of time specified by the command elapses.

7. The communication system according to claim 1, wherein the on-board device is configured to transmit data indicating the vehicle state to at least one of the first external server or the second external server, and at least one of the first external server or the second external server is configured to determine the communication method based on the data indicating the vehicle state.

8. The communication system according to claim 1, wherein the on-board device is configured, when the vehicle state satisfies a predetermined condition, to transmit a switch signal to the first external server for switching the communication method from the first communication method to the second communication method, and the first external server is configured to assign the second communication method in response to receiving of the switch signal.

* * * * *